US010929177B2

(12) United States Patent
Ziger (10) Patent No.: US 10,929,177 B2
(45) Date of Patent: Feb. 23, 2021

(54) MANAGING RESOURCES FOR MULTIPLE TRIAL DISTRIBUTED PROCESSING TASKS

(71) Applicant: Synopsys, Inc., Mountain View, CA (US)

(72) Inventor: David Howard Ziger, San Antonio, TX (US)

(73) Assignee: SYNOPSYS, INC., Mountain View, CA (US)

( * ) Notice: Subject to any disclaimer, the term of this patent is extended or adjusted under 35 U.S.C. 154(b) by 0 days.

(21) Appl. No.: 15/798,284

(22) Filed: Oct. 30, 2017

(65) Prior Publication Data

US 2018/0121251 A1 May 3, 2018

Related U.S. Application Data

(60) Provisional application No. 62/414,650, filed on Oct. 28, 2016.

(51) Int. Cl.
*G06F 9/48* (2006.01)
*G06F 9/50* (2006.01)

(52) U.S. Cl.
CPC .............. *G06F 9/4881* (2013.01); *G06F 9/48* (2013.01); *G06F 9/485* (2013.01); *G06F 9/4806* (2013.01); *G06F 9/4843* (2013.01); *G06F 9/4856* (2013.01); *G06F 9/50* (2013.01); *G06F 9/5005* (2013.01); *G06F 9/505* (2013.01); *G06F 9/5011* (2013.01); *G06F 9/5016* (2013.01); *G06F 9/5022* (2013.01); *G06F 9/5027* (2013.01); *G06F 9/5044* (2013.01); *G06F 9/5055* (2013.01); *G06F 9/5061* (2013.01); *G06F 9/5066* (2013.01); *G06F 9/5077* (2013.01); *G06F 9/5083* (2013.01); *G06F 9/5088* (2013.01)

(58) Field of Classification Search
CPC ........ G06F 9/48; G06F 9/4806; G06F 9/4843; G06F 9/485; G06F 9/4856; G06F 9/4881; G06F 9/50; G06F 9/5005; G06F 9/5011; G06F 9/5016; G06F 9/5022; G06F 9/5027; G06F 9/5044; G06F 9/505; G06F 9/5055; G06F 9/5061; G06F 9/5077; G06F 9/5083; G06F 9/5088
See application file for complete search history.

(56) References Cited

U.S. PATENT DOCUMENTS

| 8,429,663 | B2 | 4/2013 | Takagi et al. |
| 8,782,659 | B2 | 7/2014 | Saffre |
| 9,600,333 | B1 * | 3/2017 | Unrau .................. G06F 9/5061 |

(Continued)

FOREIGN PATENT DOCUMENTS

CN 102662743 A 12/2012

*Primary Examiner* — Charles M Swift
(74) *Attorney, Agent, or Firm* — Alston & Bird LLP (57) ABSTRACT

A computer-implemented method of managing resources for multiple trial distributed processing tasks is presented. The method includes estimating an expected time needed to process each of a set of mask patterns which can be independently processed. The method further includes allocating each of the set of mask patterns to a set of processing cores in accordance with the expected time, and processing the mask patterns in accordance with the allocation, when the computer in invoked to estimate, allocate, and process.

20 Claims, 8 Drawing Sheets

(56) References Cited

U.S. PATENT DOCUMENTS

| | | | | |
|---|---|---|---|---|
| 2006/0024594 A1* | 2/2006 | Schroeder | ............... | G03F 1/36 |
| | | | | 430/30 |
| 2011/0061057 A1* | 3/2011 | Harris | ............... | G06F 9/5072 |
| | | | | 718/104 |
| 2012/0284727 A1* | 11/2012 | Kodialam | ............. | G06F 9/4881 |
| | | | | 718/103 |
| 2013/0326435 A1* | 12/2013 | Chiang | ................ | G06F 30/00 |
| | | | | 716/52 |
| 2014/0040848 A1 | 2/2014 | Endo et al. | | |
| 2014/0237477 A1* | 8/2014 | Cadambi | ............... | G06F 9/4881 |
| | | | | 718/103 |
| 2014/0344813 A1* | 11/2014 | Jamjoom | ............. | G06F 9/4881 |
| | | | | 718/101 |
| 2015/0293794 A1* | 10/2015 | Levin | ................... | G06F 9/505 |
| | | | | 718/104 |
| 2016/0011908 A1* | 1/2016 | Paul | ..................... | G06F 9/5027 |
| | | | | 718/104 |
| 2016/0098292 A1* | 4/2016 | Boutin | .................. | G06F 9/505 |
| | | | | 718/104 |
| 2016/0132351 A1* | 5/2016 | Kashyap | ............. | G06F 21/566 |
| | | | | 718/1 |
| 2016/0292348 A1* | 10/2016 | Lei | ........................ | G03F 1/36 |
| 2018/0321980 A1* | 11/2018 | Lo | ......................... | G06F 9/4887 |

* cited by examiner

| TEMPLATE | TIME |
|---|---|
| A | 15 |
| C | 9 |
| D | 6 |
| F | 5 |
| B | 4 |
| E | 3 |

FIG. 6B — 610

| TEMPLATE | TIME |
|---|---|
| A | 15 |
| C | 9 |
| B, E | 7 |
| D | 6 |
| F | 5 |

FIG. 6C — 620

| TEMPLATE | TIME |
|---|---|
| A | 15 |
| D, F | 11 |
| C | 9 |
| B, E | 7 |

FIG. 6D — 630

| TEMPLATE | TIME |
|---|---|
| B, E, C | 16 |
| A | 15 |
| D, F | 11 |

MANAGING RESOURCES FOR MULTIPLE TRIAL DISTRIBUTED PROCESSING TASKS

CROSS-REFERENCES TO RELATED APPLICATIONS

This application claims priority, under 35 U.S.C. § 119(e), from U.S. Provisional Application No. 62/414,650, filed on Oct. 28, 2016, entitled "MANAGING RESOURCES FOR MULTIPLE TRIAL DISTRIBUTED PROCESSING TASKS", the content of which is incorporated herein by reference in its entirety.

BACKGROUND

The present disclosure relates generally to managing computer resources, and in particular, to a computer implemented method for managing resources for multiple trial distributed processing tasks.

Semiconductor devices are manufactured using a series of process steps including the use of photomasks in photolithography to image patterns onto semiconductor masks and wafers. As semiconductor devices are reduced in size, the process of imaging patterns onto semiconductor masks and wafers is affected by a variety of optical effects including optical diffraction.

These optical effects can be compensated for through various computationally intensive approaches. For example, multiple test patterns may be simulated and the results can be analyzed by performing optical proximity correction (OPC) on those results. For another example, different parameters may be utilized in multiple independent trials for a given image to compensate for optical effects. That is, OPC is a technique for enhancing photolithography to compensate for image errors due to optical diffraction or other effects. As a result, modifications can be made to specific patterns within a mask to compensate for these types of optical effects, thereby improving the resulting imaged wafers during test or production.

OPC involves a set of computationally intensive tasks that can take days to perform using advanced computers. For example, multiple test patterns are typically simulated on a single mask, each test pattern can be analyzed separately, allowing for the use of distributing processing to reduce the time needed to perform OPC for a given mask. Alternatively, multiple portions of a test layout may be analyzed independently or multiple trials may be performed independently using distributed processing.

With recent technology advances, the processing of mask data takes considerable computer resources. Therefore, there is a need for reducing the amount of computer resources needed for the processing of mask data.

SUMMARY

According to one embodiment of the present invention, a computer-implemented method of managing resources for multiple trial distributed processing tasks is presented. The method includes estimating an expected time needed to process each of a set of mask patterns which can be independently processed. The method further includes allocating each of the set of mask patterns to a set of processing cores in accordance with the expected time, and processing the mask patterns in accordance with the allocation, when the computer in invoked to estimate, allocate, and process.

According to one embodiment, the set of mask patterns are a set of templates. According to one embodiment, the set of templates are processed by the set of processing cores in multiple trials with different simulation parameters utilized in each trial.

According to one embodiment, the method further includes allocating each of the set of templates to each of the set of processing cores prior to processing a first one of the set of templates for a first trial. According to one embodiment, the method further includes reallocating each of the set of templates to each of the set of processing cores after the first trial. According to one embodiment, the method further includes allocating each of the set of templates as the templates are processed by the set of processing cores.

According to one embodiment of the present invention, a computer program product for managing resources for multiple trial distributed processing tasks is presented. The computer program product includes a computer readable storage medium having program instructions embodied therewith. The program instructions are executable by a processing circuit to cause the device to perform a method that includes estimating an expected time needed to process each of a set of mask patterns which can be independently processed, allocating each of the set of mask patterns to a set of processing cores in accordance with the expected time, and processing the mask patterns in accordance with the allocation, when the computer in invoked to estimate, allocate, and process.

According to one embodiment of the present invention, a data processing system for managing resources for multiple trial distributed processing tasks is presented. The data processing system includes a set of processing cores, and a memory storing program instructions. When executed by the processor, the program instructions execute the steps of estimating an expected time needed to process each of a set of mask patterns which can be independently processed, and allocating each of the set of mask patterns to the set of processing cores in accordance with the expected time. When executed by the processor, the program instructions further execute the steps of processing the mask patterns in accordance with the allocation, when the data processing system is invoked to estimate, allocate, and process.

A better understanding of the nature and advantages of the embodiments of the present invention may be gained with reference to the following detailed description and the accompanying drawings.

DETAILED DESCRIPTION

Processes and devices may be implemented and utilized for managing computer resources for multiple trial distributed processing tasks. These processes and apparatuses may be implemented and utilized as will be explained with reference to the various embodiments below.

Figure 1:
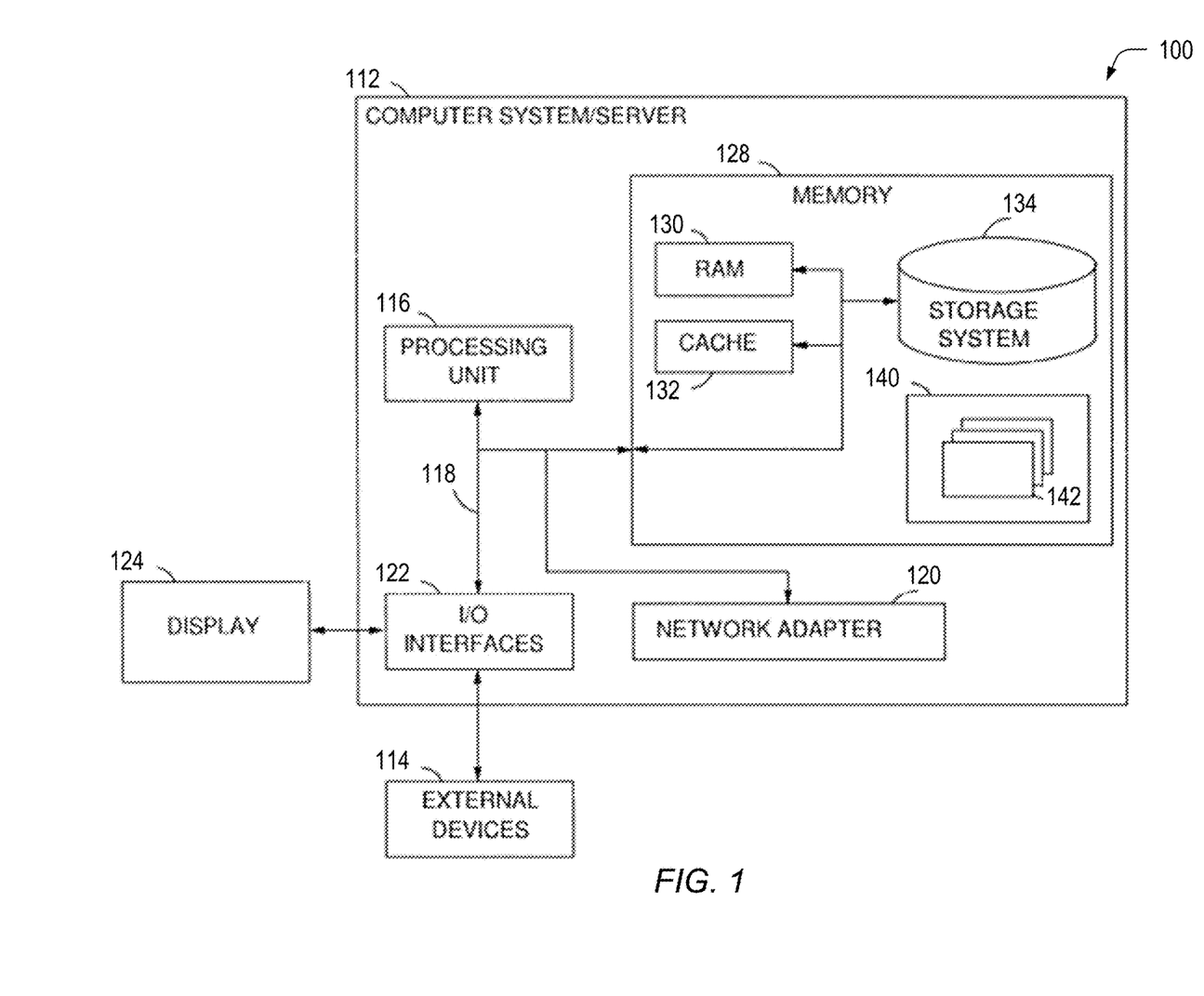
FIG. 1 depicts a simple exemplary block diagram of a data processing system in which embodiments of the present invention may be implemented.

FIG. 1 depicts a simple exemplary block diagram of a data processing system 100 in which embodiments of the present invention may be implemented. Data processing system 100 is one example of a suitable data processing system and is not intended to suggest any limitation as to the scope of use or functionality of the embodiments described herein. Regardless, data processing system 100 is capable of being implemented and/or performing any of the functionality set forth herein such as managing resources for multiple trial distributed processing tasks.

In data processing system 100 there is a computer system/server 112, which is operational with numerous other general purpose or special purpose computing system environments, peripherals, or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system executable instructions, such as program modules, being executed by a computer system. Generally, program modules may include routines, programs, objects, components, logic, data structures, and so on that perform particular tasks or implement particular abstract data types. Computer system/server 112 may be practiced in distributed computing environments where tasks are performed by remote processing devices that are linked through a communications network. In a distributed computing environment, program modules may be located in both local and remote computer system storage media including memory storage devices.

Computer system/server 112 in data processing system 100 is depicted in the form of a general-purpose computing device. The components of computer system/server 112 may include, but are not limited to, one or more processors or processing units 116, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of non-transitory computer system usable media. Such media may be any available media that is accessible by computer system/server 112, and it includes both volatile and non-volatile media, removable and non-removable media.

System memory 128 can include non-transitory computer system readable media in the form of volatile memory, such as random access memory (RAM) 130 and/or cache memory 132. Computer system/server 112 may further include other non-transitory removable/non-removable, volatile/non-volatile computer system storage media. By way of example, storage system 134 can be provided for reading from and writing to a non-removable, non-volatile magnetic media (not depicted and typically called a "hard drive"). Although not depicted, a USB interface for reading from and writing to a removable, non-volatile magnetic chip (e.g., a "flash drive"), and an optical disk drive for reading from or writing to a removable, non-volatile optical disk such as a CD-ROM, DVD-ROM or other optical media can be provided. In such instances, each can be connected to bus 118 by one or more data media interfaces. Memory 128 may include at least one program product having a set (e.g., at least one) of program modules that are configured to carry out the functions of the embodiments. Memory 128 may also include data that will be processed by a program product.

Program/utility 140, having a set (at least one) of program modules 142, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of the embodiments. For example, a program module may be software for managing resources for multiple trial distributed processing tasks.

Figure 2:
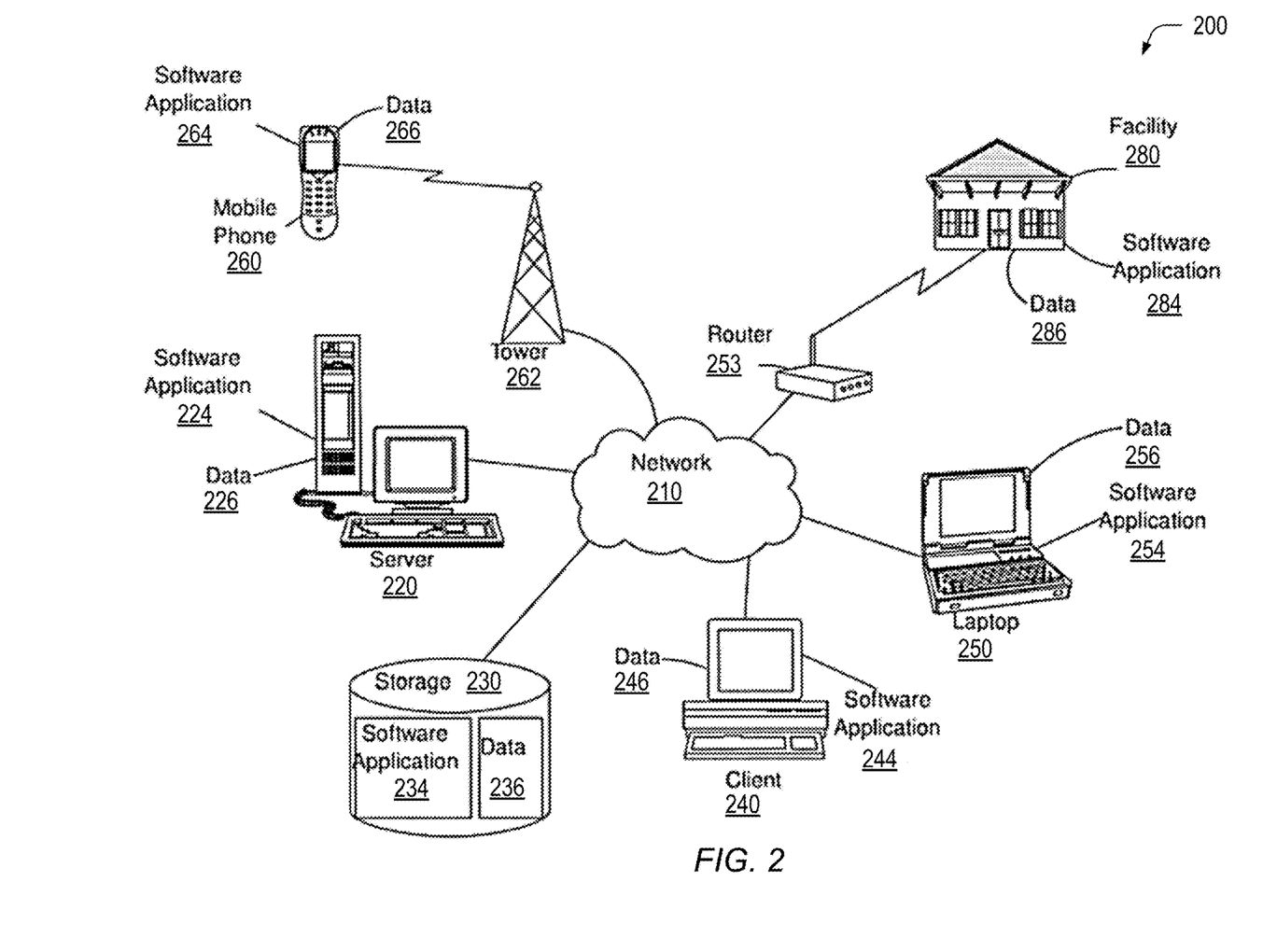
FIG. 2 depicts a simple exemplary block diagram of a data processing environment in which embodiments of the present invention may be implemented.

Computer system/server 112 may also communicate with one or more external devices 114 such as a keyboard, a pointing device, a display 124, and the like and the like; one or more devices that enable a user to interact with computer system/server 112; and/or any devices (e.g., network card, modem, and the like) that enable computer system/server 112 to communicate with one or more other computing devices. Such communication can occur via I/O interfaces 122 through wired connections or wireless connections. Still yet, computer system/server 112 can communicate with one or more networks such as a local area network (LAN), a general wide area network (WAN), and/or a public network (e.g., the Internet) via network adapter 120. As depicted, network adapter 120 communicates with the other components of computer system/server 112 via bus 118. It should be understood that although not depicted, other hardware and/or software components could be used in conjunction with computer system/server 112. Examples, include, but are not limited to: microcode, device drivers, tape drives, RAID systems, redundant processing units, data archival storage systems, external disk drive arrays, and the like FIG. 2 depicts a simple exemplary block diagram of a data processing environment 200 in which embodiments of the present invention may be implemented. Data processing environment 200 is a network of data processing systems such as described above with reference to FIG. 1. Software applications such as for managing resources for multiple trial distributed processing tasks may execute on any computer or other type of data processing system in data processing environment 200. Data processing environment 200 includes network 210. Network 210 is the medium used to provide simplex, half duplex and/or full duplex communications links between various devices and computers connected together within data processing environment 200. Network 210 may include connections such as wire, wireless communication links, or fiber optic cables.

Server 220 and client 240 are coupled to network 210 along with storage unit 230. In addition, laptop 250 and facility 280 (such as a home or business) are coupled to network 210 including wirelessly such as through a network router 253. A mobile phone 260 may be coupled to network 210 through a mobile phone tower 262. Data processing systems, such as server 220, client 240, laptop 250, mobile phone 260 and facility 280 contain data and have software applications including software tools executing thereon. Other types of data processing systems such as personal digital assistants (PDAs), smartphones, tablets and netbooks may be coupled to network 210.

Server 220 may include software application 224 and data 226 for managing resources for multiple trial distributed processing tasks or other software applications and data in accordance with embodiments described herein. Storage 230 may contain software application 234 and a content source such as data 236 for managing resources for multiple trial distributed processing tasks. Other software and content may be stored on storage 230 for sharing among various computer or other data processing devices. Client 240 may include software application 244 and data 246. Laptop 250 and mobile phone 260 may also include software applications 254 and 264 and data 256 and 266. Facility 280 may include software applications 284 and data 286. Other types of data processing systems coupled to network 210 may also include software applications. Software applications could include a web browser, email, or other software application for managing resources for multiple trial distributed processing tasks.

Server 220, storage unit 230, client 240, laptop 250, mobile phone 260, and facility 280 and other data processing devices may couple to network 210 using wired connections, wireless communication protocols, or other suitable data connectivity. Client 240 may be, for example, a personal computer or a network computer.

In the depicted example, server 220 may provide data, such as boot files, operating system images, and applications to client 240 and laptop 250. Server 220 may be a single computer system or a set of multiple computer systems working together to provide services in a client server environment. Client 240 and laptop 250 may be clients to server 220 in this example. Client 240, laptop 250, mobile phone 260 and facility 280 or some combination thereof, may include their own data, boot files, operating system images, and applications. Data processing environment 200 may include additional servers, clients, and other devices that are not depicted.

In the depicted example, data processing environment 200 may be the Internet. Network 210 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 200 also may be implemented as a number of different types of networks, such as for example, an intranet, a local area network (LAN), or a wide area network (WAN). FIG. 2 is intended as an example, and not as an architectural limitation for the different illustrative embodiments.

Among other uses, data processing environment 200 may be used for implementing a client server environment in which the embodiments may be implemented. A client server environment enables software applications and data to be distributed across a network such that an application functions by using the interactivity between a client data processing system and a server data processing system. Data processing environment 200 may also employ a service oriented architecture where interoperable software components distributed across a network may be packaged together as coherent business applications.

Figure 3A:
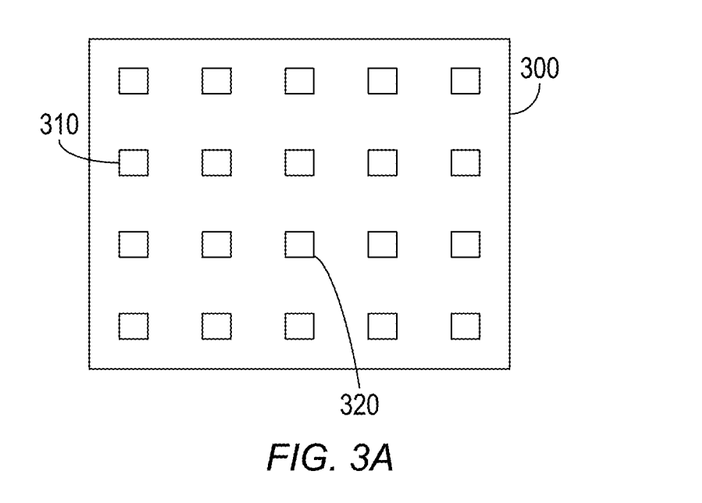
FIGS. 3A-3C depict simple exemplary diagrams of a portion of a mask which may be used by embodiments of the present invention.
Figure 3B:
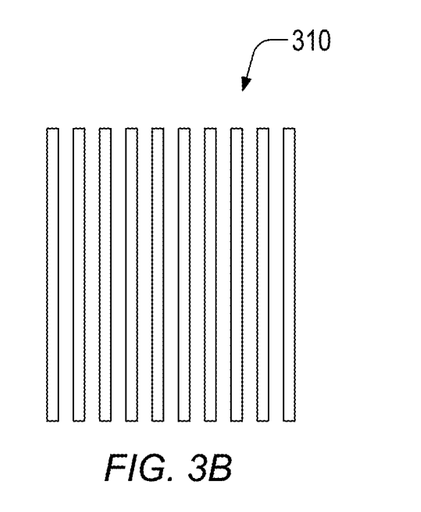
Figure 3C:
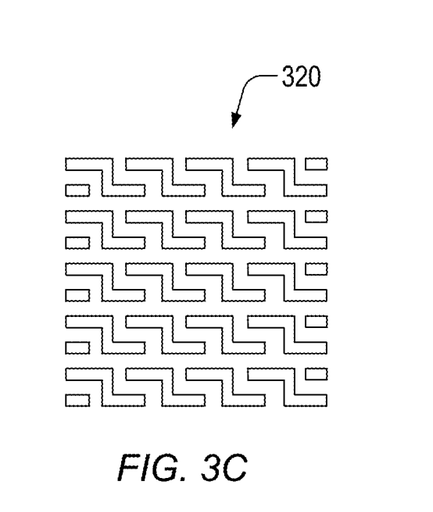

FIGS. 3A-3C depict simple exemplary diagrams of a portion of a mask 300 which may be used by embodiments of the present invention. These could be portions of a test mask or templates on a production or test mask or simulated as such. A template is a type of mask pattern useful for performing proximity correction tasks. Other types of mask patterns can include double and multi-patterning images or other actual or simulated features on a mask which can be useful in semiconductor lithography operations. Imaging as described herein can include physical imaging or simulated imaging. In FIG. 3A, a portion of mask 300 includes twenty (20) test patterns imaged by a mask including test pattern 310 and test pattern 320. These test patterns may be imaged in one specific area of a mask or in various locations across the mask or their images may be simulated. In addition, many more test patterns may be imaged onto a single mask including multiple copies of the same test pattern in various locations of the mask to identify changes caused by imaging location. Each test pattern is often separated from other test patterns on the mask to avoid any interference between templates. However, multiple templates could be grouped together in a full layout test pattern. With a full layout approach, each template can have a context (proximity effects for geometries near the template boundary) so it can be simulated with knowledge of neighboring features. In alternative embodiments, selected portions of a test pattern may be analyzed separately and independently for different effects.

In this example, each test pattern can include specific patterns for identifying or otherwise characterizing certain lithography effects, which can then be optimized to improve the resulting test pattern or subsequent production patterns. For example, when magnified, one can see that test pattern 310 includes a series of parallel lines as depicted in FIG. 3B. Specific points within these parallel lines can be measured to identify specific effects of lithography such as diffraction. The effects can then be minimized or otherwise optimized by making adjustments to the test patterns or subsequent production patterns of masks used to image these types of patterns. For another example, when magnified, one can see that test pattern 320 of FIG. 3C includes a series of short lines with curves for identifying other effects of lithography. Each test pattern can be used to test certain effects of lithography. These test patterns can be commonly used across many companies, although many test patterns may be proprietary to a specific company.

A test layout can include one or more test patterns including a variety of test patterns or specific test elements that are not separated from each other, but are interconnected, adjacent to each other, or otherwise commingled. Each test pattern in a test layout can typically be analyzed using characterization and optimization tasks including performing repeated trials with different inputs. As a result, each test pattern may generally be analyzed separately and independently from other test patterns, thereby allowing for parallel processing of each test pattern. In addition, subsections of a given test pattern can be identified for separate and independent analysis, allowing for parallel processing of each identified test pattern subsection. A template is a test layout, test pattern or test pattern subsection which can be analyzed separately and independently from other templates using parallel processing. Templates can be created by software tools so they can be processed independently. Templates can be created with context from surrounding templates so that they can be processed independently but with knowledge about their environments.

At a higher level, repeated or multiple trials of templates imaged on a mask can be arranged with different inputs so that each trial can be analyzed separately and independently from other trials (e.g., a numerical aperture set to 0.6 or 0.8), thereby allowing for parallel processing of each trial. In addition, each trial may be decomposed by template into multiple independent trials for parallel processing. Such is the case for optimizing optical proximity correction (OPC) in which it is desirable to evaluate alternative OPC treatments such as different numerical apertures, particle coherence, and the like In summary, multiple trials may be performed on templates derived from a mask whereby each trial of each template can be performed independently through parallel processing. This can result in hundreds or more independent trials of templates for characterization and optimization through parallel processing analysis.

Figure 4:
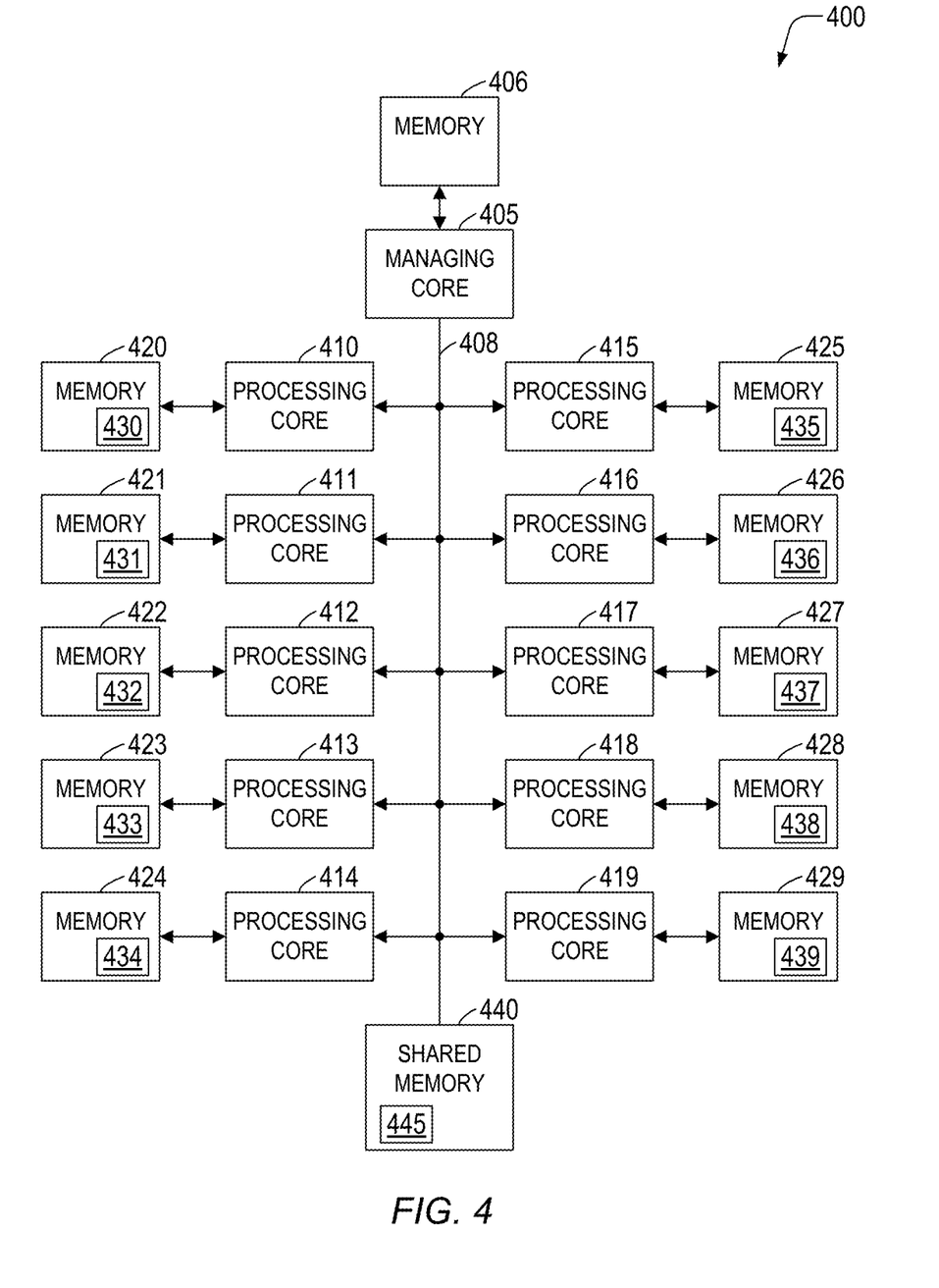
FIG. 4 depicts a simple exemplary diagram of multiple distributed cores for analyzing multiple trials of multiple templates, in accordance with one embodiment of the present invention.

FIG. 4 depicts a simple exemplary diagram of multiple distributed cores 400 for analyzing multiple trials of multiple templates, in accordance with one embodiment of the present invention. In this example, there is a managing core 405 with memory 406 and ten (10) processing cores 410-419 illustrated that are interconnected with a network 408. Each processing core can be a separate server or computer, a processor or set of processors within a server, a processor within a parallel processing system, and the like Each processing core can process data independently from the other processing cores. Also each processing core utilizes memory 420-429 that includes software 430-439 for processing data.

Alternatively, a shared memory 440 and a shared software image 445 can be utilized by processing cores 410-419, each processing core utilizing a separate instance of the shared software image. In another alternative, the software image may be stored in memory 406 of managing core 405. Depending on the type of software license agreement, the software may be limited to a specific set of processing cores, a certain number of processing cores at any one time, or other types of limitations. As a result, the number of processing cores available for analyzing trials across multiple templates in parallel may be limited by the number of physical processing cores (e.g., processors) available, the number of software licenses available, or the number of processing cores that can process data concurrently under a given software license agreement. The number of processing resources is the number of processing cores that have software licenses for processing trials of templates concurrently.

In a simple case, there may be only 2 trials for 20 different templates requiring 40 different computational processes of images, each template capable of being processed or otherwise analyzed independently for each trial. Also in this simple case, there are 40 processing cores, each processing core having a software license for performing the desired analysis, thereby resulting in 40 processing resources. Each of the 20 templates for both trials can then be analyzed by one or 40 processing resources concurrently. In such a case, the time needed for processing both trials of all the templates will be the time to process a single trial for the longest running template.

Figure 5:
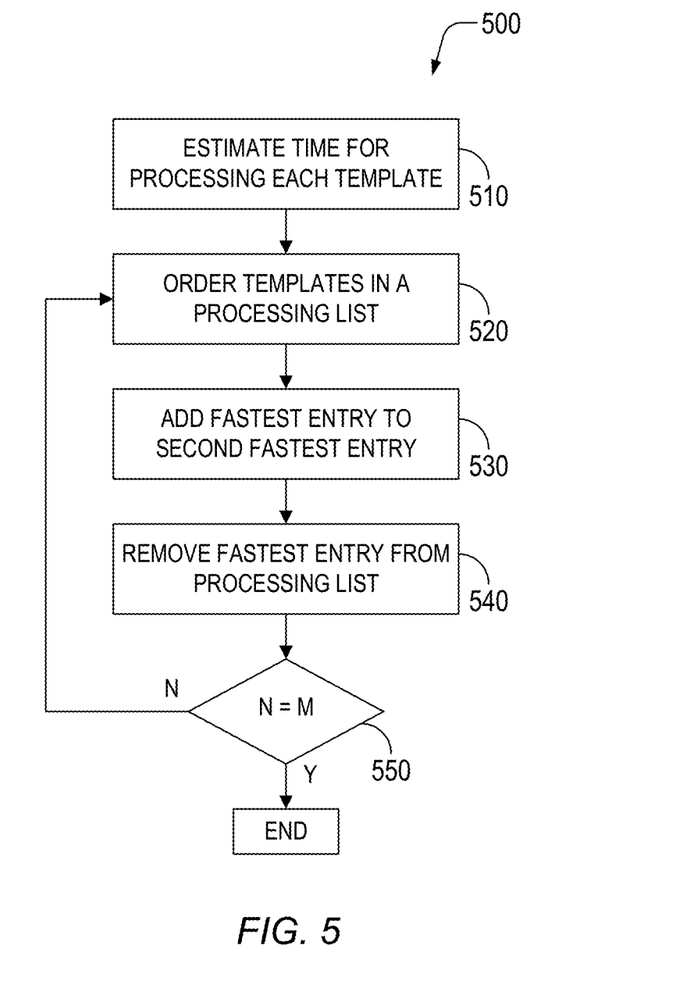
FIG. 5 depicts a simple exemplary first flow diagram for optimizing processing resource usage, in accordance with one embodiment of the present invention.

Typically the time needed for running a trial varies by template. That is, in the simple case described above, the time needed for processing a first trial for a first template will be similar in length to processing a second separate trial on that same template. However, the time needed for processing the first trial on a second template will likely be different from the first trial on the first template. However, processing the second trial on the second template is usually relative in length to the first trial on that same template since the variation in processing trials between templates typically varies significantly based on a variety of factors such as template complexity. Template complexity can vary due to template size, the number of template vertices, and the like If the number of processing resources is reduced, then the trials for each template or the number of processing resources for each trial need to be allocated. FIG. 5 depicts a simple exemplary first flow diagram 500 for optimizing processing resource usage, in accordance with one embodiment of the present invention. This process can be performed prior to allocating templates to processing cores for analyzing, or it may be performed at any time afterwards to reallocate templates to processing cores for analyzing such as described below with reference to FIG. 7. Referring again to FIG. 5, there are M processing cores and N template entries with N greater that M. If N is less than or equal to M then each template could be processed by a single processing core for each trial.

In a first step 510, an estimated time for processing each template is determined. This can be determined by performing a test run of each template using a simplified trial, processing a first trial on each template, or by examining each template and generating an estimation of processing time based on template complexity. Alternative embodiments may use historical information from prior processing of each template on other masks. If this process is being re-run after several trials have been processed, then an average, median or other measure may be used to determine an estimated time for processing each template for the remaining trials. Then in step 520, the template entries are ordered by estimated processing time into a processing list such as described below with reference to FIG. 6A-6D. That is, the template entries are ordered from the fastest estimated processing time to the slowest estimated processing time (or from slowest to fastest).

Subsequently, in step 530, the fastest estimated processing time is added to the second fastest estimated processing time so that the fastest and second fastest template entries (by processing) will be processed by the same processing core. Then in step 540 the fastest estimated processing time entry can then be removed from the processing list as it has been added to the second fastest estimated processing time. Then in step 550, it is determined whether the number of processing cores (M) equals the number of template entries on the processing list (N). If not, then processing returns to step 520, otherwise this process ceases and the templates can be analyzed in accordance with the processing list for each trial.

In an alternative embodiment, each template may be an entry in a processing list and allocated to a specific processing core. The allocation is similarly performed using the method described above with reference to FIG. 5, but with a link for each template entry to a processing core such that one or more processing cores may have multiple templates allocated to it. Many other types of processing lists or other data representations can be utilized to implement the process described above.

Figure 6A:
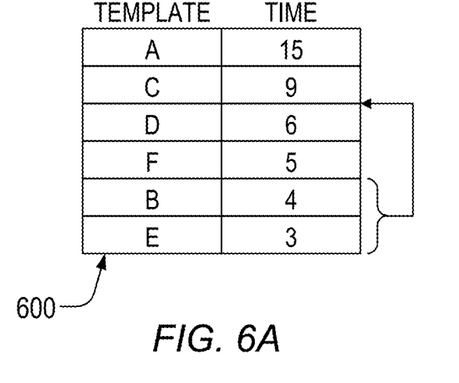
FIGS. 6A-6D depict simple exemplary illustrations of a processing list, in accordance with one embodiment of the present invention.

FIGS. 6A-6D depict simple exemplary illustrations of a processing list, in accordance with one embodiment of the present invention. In this simplified example, there are 6 templates (referred to as templates A through F) and 3 processing cores so that three templates need to be allocated to processing cores with other templates in this embodiment. In FIG. 6A, a processing list 600 is depicted with templates A-F, each template depicted with an expected time for execution in an arbitrary unit of time. The expected time can be in terms of time, processing cycles, or any other unit of measure which could be utilized for representing the relative time needed for processing that template for a given trial. The expected time could also be normalized. FIG. 6A is depicted with the templates already ordered by processing time as would be performed in step 520 above. Templates B and E are the two fastest templates and should be processed by the same processing core serially.

Figure 6B:
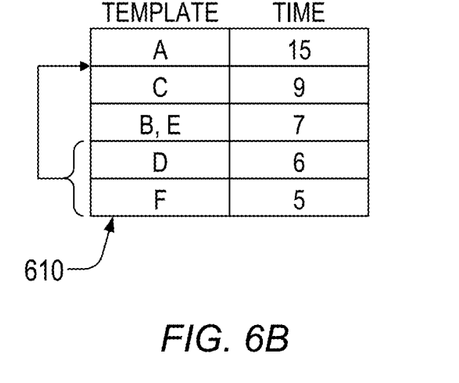

In FIG. 6B, an updated processing list 610 is depicted with templates B and E combined for processing on a common processing core serially. The entries have been reordered by time of processing. In this example, E has a run time of 3 and B a run time of 4, so the combination would have a run time of 7. Since there are 5 entries in processing list 610, the fastest two entries should be combined, which would be template D and template F for processing by the same processing core serially.

Figure 6C:
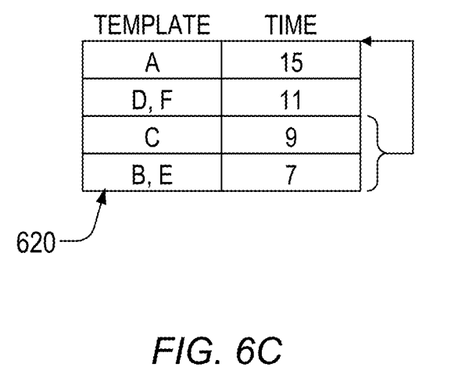

In FIG. 6C, an updated processing list 620 is depicted with templates D and F combined for processing on a common processing core serially. The entries have been reordered by time of processing. In this example, F has a run time of 5 and D a run time of 6, so the combination would have a run time of 11. Since there are 4 entries in processing list 620, the fastest two entries should be combined, which would be templates B, E and template C for processing by the same processing core serially.

Figure 6D:
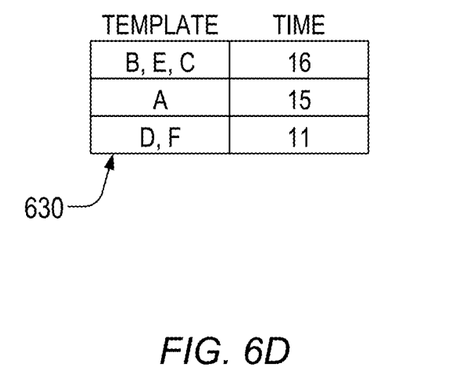

In FIG. 6D, an updated processing list 630 is depicted with templates B, E and C combined for processing on a common processing core serially. The entries have been reordered by time of processing. In this example, B and E have a combined run time of 7 and C a run time of 9, so the combination would have a run time of 16. Since all 6 of the templates have now been allocated into 3 lines in processing list 630, each line being associated with one of the 3 different processing cores, there is no more need for further template allocation.

Figure 7:
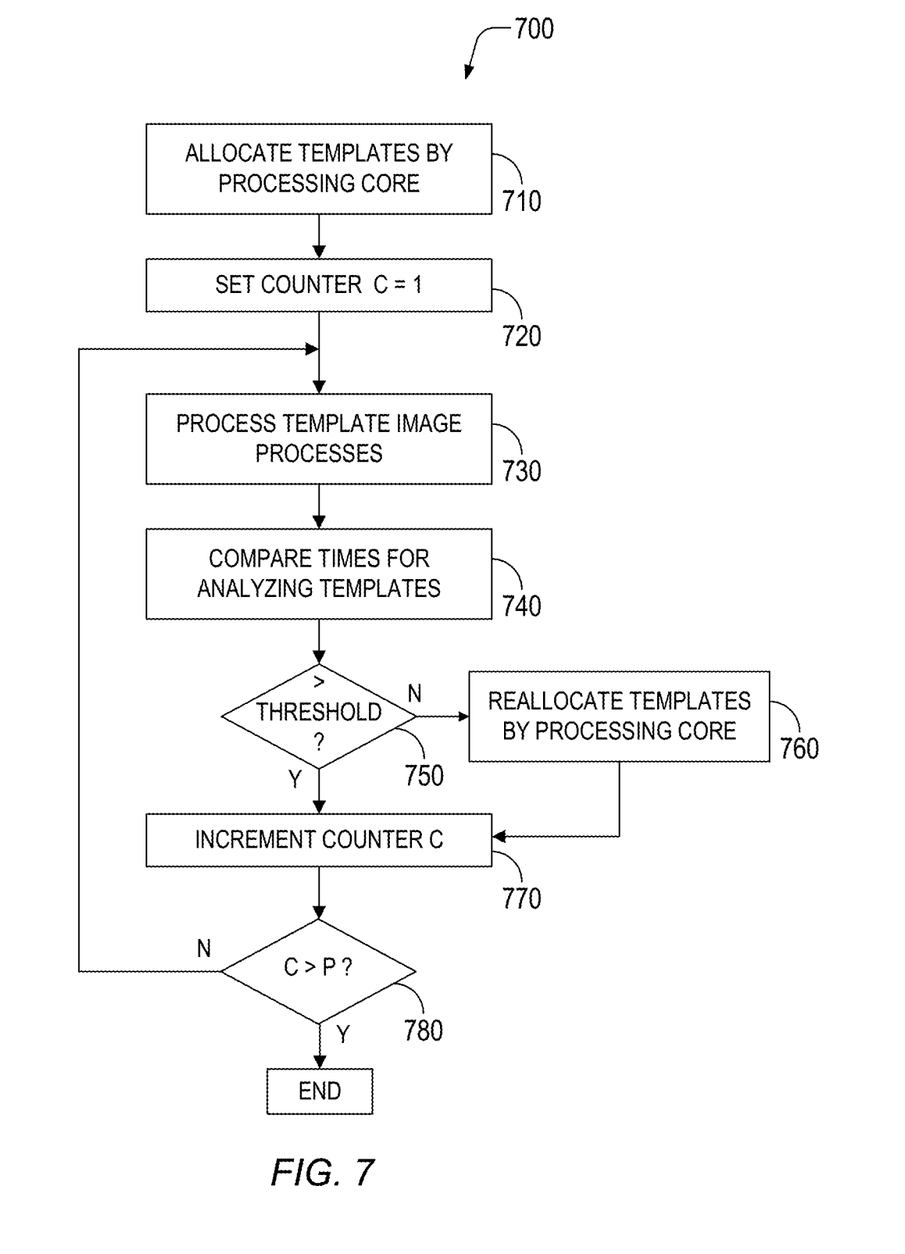
FIG. 7 depicts a simple exemplary flow diagram for optimizing processing resource usage while running multiple trials, in accordance with one embodiment of the present invention.

FIG. 7 depicts a simple exemplary flow diagram 700 for optimizing processing resource usage while running multiple trials, in accordance with one embodiment of the present invention. In this case there are P trials to be run for N templates on M processing cores. As a result, there will be a total of P×N analyses of templates with M processing cores. In a first step 710, the templates are allocated for processing by the processing cores as described above with reference to FIG. 5. This generates an initial allocation of templates for a given trial across the processing cores. Alternatively, the templates may be allocated randomly or in some fixed pattern across the processing cores before proceeding. The process described above with reference to FIG. 5 may be performed after the first trial is completed. In a second step 720, counter C is set to 1. In a third step 730, all templates for trial C are analyzed using the current allocation of the templates for each core processor.

Then in steps 740 and 750, it is determined whether the current allocation of templates for each processing core needs adjusting. This can be determined by comparing how quickly each template was processed in the previous trial and the overall trial runtime, the past few trials, or all trials since this process was initiated in step 740, then determining in step 750 whether that comparative analysis is within an acceptable predetermined threshold. This analysis can be performed by template or by processing core. The predetermined threshold may be, for example, the largest runtime penalty specified by the user for reducing the number of cores for a trial. If an adjustment is needed, then processing proceeds to step 760, otherwise processing continues to step 770.

In step 760, the templates are reallocated for processing by the processing cores as described above with reference to FIG. 5. This generates an updated allocation of templates for a given trial across the processing cores. That is, the templates are reallocated utilizing the analysis from step 740. Processing then continues to step 770. In step 770, counter C is incremented by 1. In step 780, if counter C now exceeds the number of trials P, then processing come to an end, otherwise processing returns to step 730.

Figure 8:
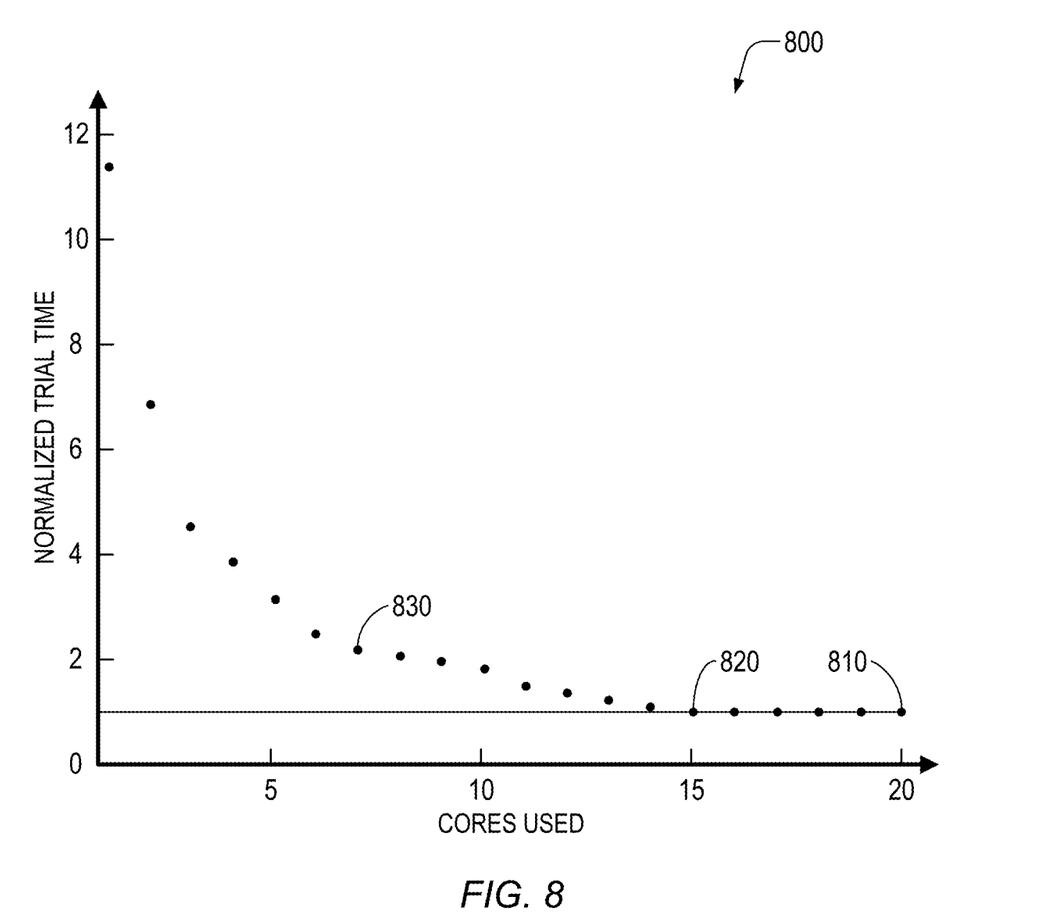
FIG. 8 depicts a simple exemplary graph showing the effects of adding or subtracting processing cores when processing a trial, in accordance with embodiments of the present invention.

FIG. 8 depicts a simple exemplary graph 800 showing the effects of adding or subtracting processing cores when processing a trial, in accordance with embodiments of the present invention. In this illustration, the time needed to analyze each template is normalized so that the longest time to process any of the templates for a given trial is set to a value of one. This illustration also includes 20 different templates requiring analysis of all 20 templates for a given trial. This graph can be generated using the method described above with reference to FIG. 5 multiple times while varying the number of processing cores available when analyzing a given number of templates (20 in this example).

Since the longest normalized time needed for analyzing a template is one, then the shortest time that all templates can be analyzed is also one. Clearly this can occur when the number of processing cores used equals the number of templates as depicted at point 810 of the graph. However, some combinations may be utilized without extending the time needed to analyze all 20 templates as depicted at point 820 of the graph. As a result, if time is of the essence, all 20 templates could be analyzed for a given trial using only 15 processing cores without noticeably increasing overall trial time. Given that there is typically a cost savings in reducing the number of processing cores, such analysis would be beneficial. These costs savings include a reduction in hardware used and software used, both of which incur costs such as hardware purchases and software licensing.

If time is not of the essence and a cost benefit analysis could be performed, then graph 800 illustrates how such an analysis could be utilized. For example, one processing core (hardware and software) may cost a certain amount and reducing the amount of time to process a given trial (or set of trials) may have a certain benefit by reducing chip design cycle time. The costs and benefits could be compared to determine that an optimum number of processing cores is 7 with a normalized time of 2 as depicted at point 830. As a result, only 7 cores would be needed to analyze 20 templates in such an example. Of course, the exact number would vary by entity needing the OPC analysis. In addition, the graph depicted could vary significantly depending on the normalized times needed to analyze templates in a given example.

The above described techniques for managing resources for multiple trial distributed processing tasks may also be utilized for processing other types of mask patterns. For example, the above described techniques could be utilized for decomposition of multiple patterning such as double patterning technology (DPT).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks depicted in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code such as for managing resources for multiple trial distributed processing tasks. A client data processing system may download that computer usable code, such as for storing on a data storage medium associated with the client data processing system, or for using in the client data processing system. The server data processing system may similarly upload computer usable code from the client data processing system such as a content source. The computer usable code resulting from a computer usable program product embodiment of the illustrative embodiments may be uploaded or downloaded using server and client data processing systems in this manner.

Input/output or I/O devices (including but not limited to keyboards, displays, pointing devices, and the like) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The above embodiments of the present invention are illustrative and not limiting. Various alternatives and equivalents are possible. In addition, the technique and system of the present invention is suitable for use with a wide variety of electronic design automation (EDA) tools and methodologies for designing, testing, and/or manufacturing. The scope of the invention should, therefore, be determined not with reference to the above description, but instead should be determined with reference to the pending claims along with their full scope or equivalents.

What is claimed is:

1. A computer-implemented method of managing resources for multiple trial distributed processing tasks to facilitate fabrication of a semiconductor integrated circuit, the method comprising:
    receiving imaging data representative of each of a set of mask patterns defined within corresponding portions of a test mask, and wherein each of the set of mask patterns are configured to compensate for optical effects in the fabrication of the semiconductor integrated circuit;
    estimating an expected time needed to process each of the set of mask patterns which can be independently processed;
    allocating each of the set of mask patterns to a processing core within a set of processing cores in accordance with the expected time, wherein allocating each of the set of mask patterns comprises:
        identifying at least two mask patterns of the set of mask patterns having a shortest expected time needed to process; and
        allocating the identified at least two mask patterns to a first processing core within the set of processing cores; and
        wherein each of the set of processing cores is allocated at least one mask pattern of the set of mask patterns; and
    processing each of the set of mask patterns in accordance with the allocation.

2. The method of claim 1, wherein the set of mask patterns are a set of templates.

3. The method of claim 2, wherein the set of templates are processed by the set of processing cores in multiple trials with different simulation parameters utilized in each trial.

4. The method of claim 3 further comprising allocating each of the set of templates to each of the set of processing cores prior to processing a first one of the set of templates for a first trial.

5. The method of claim 4 further comprising reallocating each of the set of templates to each of the set of processing cores after the first trial.

6. The method of claim 3 further comprising allocating each of the set of templates as the templates are processed by the set of processing cores.

7. The method of claim 6 further comprising reallocating each of the set of templates to each of the set of processing cores after the first trial.

8. A computer program product for managing resources for multiple trial distributed processing tasks to facilitate fabrication of a semiconductor integrated circuit, the computer program product comprising a computer readable storage medium having program instructions embodied therewith, the program instructions executable by a processing circuit to cause the device to perform a method comprising:
    receiving imaging data representative of each of a set of mask patterns defined within corresponding portions of a test mask, and wherein each of the set of mask patterns are configured to compensate for optical effects in the fabrication of the semiconductor integrated circuit;
    estimating an expected time needed to process each of a set of mask patterns which can be independently processed;
    allocating each of the set of mask patterns to a processing core within a set of processing cores in accordance with the expected time, wherein allocating each of the set of mask patterns comprises:
        identifying at least two mask patterns of the set of mask patterns having a shortest expected time needed to process; and
        allocating the identified at least two mask patterns to a first processing core within the set of processing cores; and
        wherein each of the set of processing cores is allocated at least one mask pattern of the set of mask patterns; and
    processing each of the set of mask patterns in accordance with the allocation.

9. The method of claim 8, wherein the set of mask patterns are a set of templates.

10. The method of claim 9, wherein the set of templates are processed by the set of processing cores in multiple trials with different simulation parameters utilized in each trial.

11. The method of claim 10 further comprising allocating each of the set of templates to each of the set of processing cores prior to processing a first one of the set of templates for a first trial.

12. The method of claim 11 further comprising reallocating each of the set of templates to each of the set of processing cores after the first trial.

13. The method of claim 10 further comprising allocating each of the set of templates as the templates are processed by the set of processing cores.

14. A data processing system for managing resources for multiple trial distributed processing tasks to facilitate fabrication of a semiconductor integrated circuit, the data processing system comprising:
- a set of processing cores; and
- a memory storing program instructions which when executed by the processor execute the steps of:
- receiving imaging data representative of each of a set of mask patterns defined within corresponding portions of a test mask, and wherein each of the set of mask patterns are configured to compensate for optical effects in the fabrication of the semiconductor integrated circuit;
- estimating an expected time needed to process each of a set of mask patterns which can be independently processed;
- allocating each of the set of mask patterns to a processing core within the set of processing cores in accordance with the expected time, wherein allocating each of the set of mask patterns comprises:
- identifying at least two mask patterns of the set of mask patterns having a shortest expected time needed to process; and
- allocating the identified at least two mask patterns to a first processing core within the set of processing cores; and
- wherein each of the set of processing cores is allocated at least one mask pattern of the set of mask patterns; and
- processing each of the set of mask patterns in accordance with the allocation.

15. The method of claim 14, wherein the set of mask patterns are a set of templates.

16. The method of claim 15, wherein the set of templates are processed by the set of processing cores in multiple trials with different simulation parameters utilized in each trial.

17. The method of claim 16 further comprising allocating each of the set of templates to each of the set of processing cores prior to processing a first one of the set of templates for a first trial.

18. The method of claim 17 further comprising reallocating each of the set of templates to each of the set of processing cores after the first trial.

19. The method of claim 16 further comprising allocating each of the set of templates as the templates are processed by the set of processing cores.

20. The method of claim 19 further comprising reallocating each of the set of templates to each of the set of processing cores after the first trial.

* * * * *